UNITED STATES PATENT OFFICE.

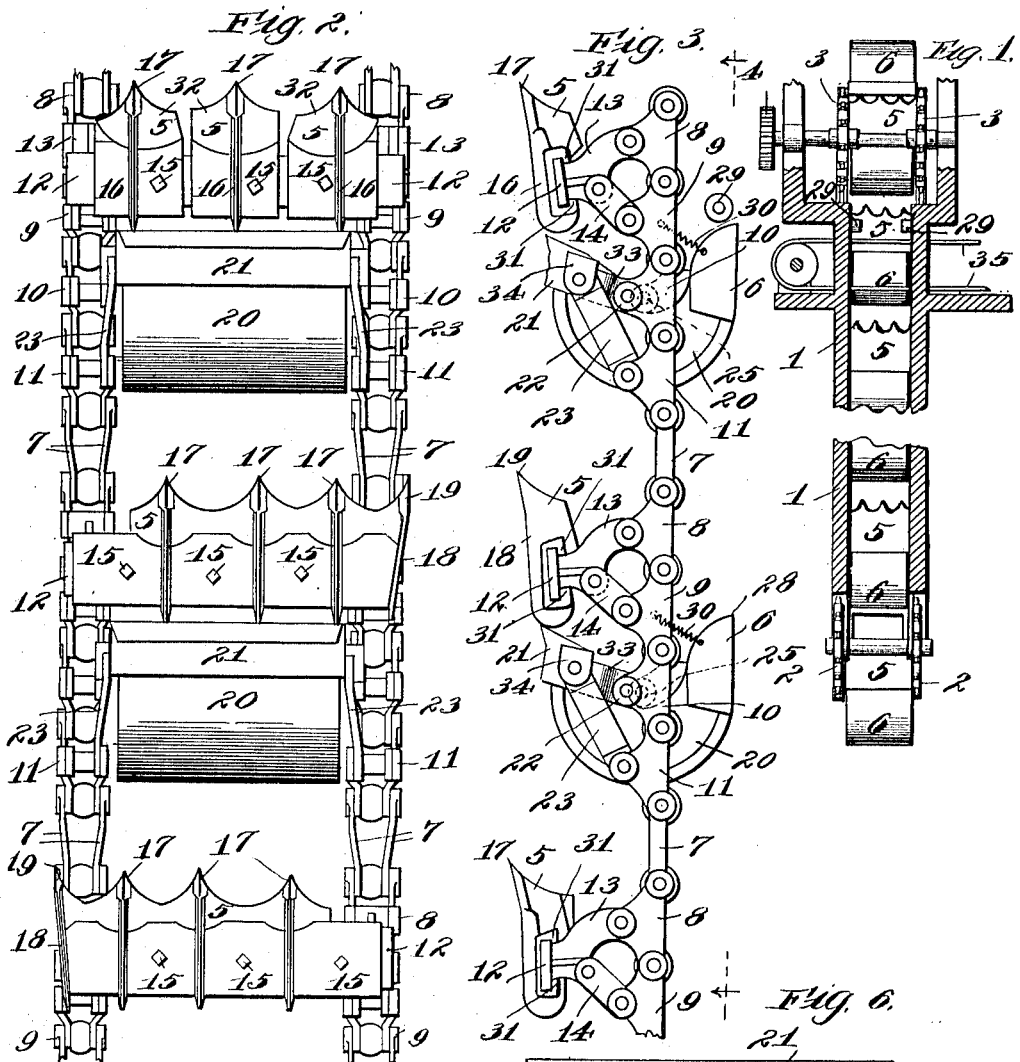

PETER J. LYBACK, OF CHICAGO, ILLINOIS.

BELT EXCAVATOR.

1,020,296.  Specification of Letters Patent.  Patented Mar. 12, 1912.

Original application filed August 26, 1909, Serial No. 514,753. Divided and this application filed March 21, 1910. Serial No. 550,735.

*To all whom it may concern:*

Be it known that I, PETER J. LYBACK, a citizen of the United States, and resident of the city of Chicago, in the county of Cook and State of Illinois, have invented certain new and useful Improvements in Belt Excavators, of which the following is a specification.

My invention relates to belt excavators, and its object is to provide a machine of that character which shall be simple and economical in construction and very effective in operation. This object is attained by, and my invention is embodied in, the following described mechanism, illustrated by the accompanying drawings, in which:—

Figure 1 is a section of my belt-carrying frame taken on a plane in which lie the axes of the sprocket wheels on which the excavator belt travels, looking in the direction of the arrow in Fig. 3, together with the supported parts: Fig. 2 is an enlarged front elevation of a section of the belt chains with the earth cutters and buckets: Fig. 3 is a left side elevation of the same: Fig. 4 is a diagrammatic representation of the cutting edges of the three cutters shown in Fig. 2 illustrating the form of cut made thereby: Fig. 5 is a vertical transverse section of one of the buckets: and Fig. 6 is a plan view of the same with the rearward part broken away.

On the supporting frame 1 are journaled suitable sprocket wheels 2 and 3, the latter being driven as by a gear 4. These sprocket wheels carry a pair of chain belts as shown with the earth cutters 5 and buckets 6. The unital sections of the chain belts are connected, as by the links 7, and comprise a series of four links 8, 9, 10, and 11. In each section a horizontal bar 12 connecting the pair of chains is pivotally connected at each end with the link 8 by a link bar 13, and is pivotally connected with the link 9 by a link 14 in such manner, as shown, as to permit the links of the chain belts to freely turn on their connecting pivots in passing around the sprocket wheels. The horizontal bars 12 carry the earth cutters 5 having forwardly or upwardly extending cutting edges as shown. These cutters 5 are adjustable longitudinally the bar 12 (to which they are slidably held by their embracing flanges 31) as by the set screws 15, in order that, as shown by the lower two cutters in Fig. 2, one of these two cutters may be moved to the right and the other to the left to a desired adjustment so that ditches of different widths and wider than the chain belt may be cut. The cutters preferably present, as shown in horizontal section, a series of arcs, convexed forward, each arc being preferably provided with a central vertical strengthening rib 16 terminating upwardly in a pick point 17, the lower two cutters shown in Fig. 2 having at their outer ends similar ribs 18 and points 19. The cutters are arranged in batteries or series of successive twos, comprising the lower two shown in Fig. 2, in order that ditches of different widths and wider than the chain belt may be cut uniformly; and preferably the batteries comprise three successive cutters including also the uppermost shown in Fig. 2, which is composed of separate arc sections 32 as shown, so that they may be severally adjusted on their bar 12 in order that their points 17 may be positioned to cut midway between those of the other two cutters of the series which have been previously adjusted to cut a ditch of the desired width. The cutting edges of these batteries of three in the adjustment shown in Fig. 2, to effect this end, are diagrammatically shown in Fig. 4. As the earth is shaved off by the cutters, it falls into the buckets 6 which are carried by the chain belts immediately below the cutters. These buckets connect the pair of belt chains and comprise a receptacle 20 for the excavated earth and a supporting frame 21. This frame is pivoted at 22 through the ear 33 to the link 10 and through the ear 34 to the link 23 which is pivoted to the link 11, all in a similar manner and for a similar purpose as the cutters 5 are connected to the belt chains by the link bar 13 and link 14. It will be seen however that the link 23 being longer than the link 14, the outer lip of the bucket frame 21 will in passing around the lower sprocket wheel 2 be thrown outwardly or downwardly as far as the cutters 5 and thus scrape up the loose earth in the bottom of the ditch or excavation, whereas, when the cutters and buckets are between the sprocket wheels on the straight portion of the chain belt said lip is slightly to the rear of the cutting line of the cutters. The bucket frame 21 extending backward outside the receptacle 20, is turned over the edge of the end thereof forming a stop 24 to prevent that side of the receptacle next said outer lip from tilting forward, the receptacle being pivoted at 25 on the frame 21 concentric with its curved inner surface.

To the frame 21 inside the receptacle is rigidly fixed a receptacle cleaner comprising arms 26 extending radially from the pivot 25 at either end of the receptacle and a horizontal bar 27 connected therewith, said arms and bar being adapted to scrape out the contents of the receptacle when the same is tilted by its strikers 28 engaging with stops 29 on the frame 1, and thus discharge the excavated earth, after which the receptacle is returned to its position shown in Figs. 2 and 3, as by the spring 30. When the excavated earth is emptied from the receptacle it falls on the conveyer belt 35 which discharges it at a distance to one side.

My belt excavator may be mounted on any suitable vehicle and operated by suitable power, in any well know manner.

The subject matter of this present application is divided as required from my pending application for a ditching machine, Serial Number 514753 filed August 26, 1909.

Not confining myself to the details of construction shown and described further than as set forth in the claims, I claim:

1. In a machine of the character described, a chain belt, a series of transverse bars carried thereby, and earth cutters, each in cross section a series of forwardly convexed arcs, and adjustable longitudinally the bars.

2. In a machine of the character described, a chain belt, a series of transverse bars carried thereby, and earth cutters, each in cross section a series of forwardly convexed arcs having strengthening ribs terminating in pick points, and adjustable longitudinally the bars.

3. In a machine of the character described, a chain belt, and a series of batteries of two earth cutters adjustable longitudinally transverse bars carried by the chain belt, one cutter to a position to cut beyond one side of the belt and the other to a position to cut beyond the other side of the belt, said cutters presenting a combined continuous cutting line transverse to the direction of cutting.

4. In a machine of the character described, a chain belt, transverse bars carried thereby, and batteries of three earth cutters, each cutter in cross section a series of forwardly convexed arcs, two of the cutters being adjustable longitudinally their said bars to a position to cut a desired width, and the third cutter having separate arc members severally adjustable longitudinally their said bar to a position to cut intermediately the arcs of the other two cutters.

5. In a machine of the character described, a chain belt, earth cutters each pivotally mounted on a link of the belt and supported by a link pivoted to the cutter and to another link of the belt, and buckets each pivotally mounted below its cutter on a link of the belt and supported by a link pivoted to the bucket and to another link of the belt, the bukets' supporting links being longer than the cutters' supporting links and adjusted to throw the buckets farther outwardly in relation to the cutters on a curved portion of the belt than on a straight portion of the belt, for the purpose described.

6. In a machine of the character described, a chain belt and excavator buckets, each having a supporting frame carried by the belt, a receptacle pivoted on the frame, and a receptacle cleaner rigidly supported by the frame inside the receptacle and adapted by the tilting of the receptacle on its pivot to scrape out its contents.

7. In a machine of the character described, a chain belt and excavator buckets, each bucket having a supporting frame carried by the belt, a receptacle pivoted on the frame, a stop on the frame to prevent the receptacle from tilting forward, and a receptacle cleaner rigidly supported by the frame inside the receptacle and adapted by the tilting of the receptacle on its pivot to scrape out its contents.

8. In a machine of the character described, a chain belt, and a series of batteries of two earth cutters adjustable longitudinally transverse bars carried by the chain belt, one cutter toward one side of the belt and the other toward the other side of the belt, said cutters presenting a combined continuous cutting line transverse to the direction of cutting.

9. In a machine of the character described, a chain belt, transverse bars carried thereby, and earth cutters carried by the bars and adjustable thereon in order to excavate ditches of different widths, said cutters presenting a combined continuous cutting line transverse to the direction of cutting.

In witness whereof, I have signed my name to this specification in the presence of two subscribing witnesses.

PETER J. LYBACK.

Witnesses:
F. S. McElherne,
H. C. Hall.